United States Patent
Maeda et al.

(10) Patent No.: US 10,106,659 B2
(45) Date of Patent: Oct. 23, 2018

(54) FILM FOR MOLDING

(71) Applicant: Toray Industries, Inc., Tokyo (JP)

(72) Inventors: Shinji Maeda, Otsu (JP); Toshiya Ieki, Otsu (JP); Shinji Takauchi, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/652,526

(22) PCT Filed: Dec. 24, 2013

(86) PCT No.: PCT/JP2013/084423
§ 371 (c)(1),
(2) Date: Jun. 16, 2015

(87) PCT Pub. No.: WO2014/103988
PCT Pub. Date: Jul. 3, 2014

(65) Prior Publication Data
US 2015/0344647 A1 Dec. 3, 2015

(30) Foreign Application Priority Data
Dec. 27, 2012 (JP) .................. 2012-283936

(51) Int. Cl.
*B29C 31/08* (2006.01)
*B32B 3/02* (2006.01)
(Continued)

(52) U.S. Cl.
CPC .............. *C08J 5/18* (2013.01); *B29C 31/08* (2013.01); *B29C 47/004* (2013.01);
(Continued)

(58) Field of Classification Search
CPC ................. Y10T 428/1452; Y10T 428/24355
(Continued)

(56) References Cited

U.S. PATENT DOCUMENTS

2004/0146697 A1* 7/2004 Coburn, Jr. ............... B32B 7/06
428/167
2006/0159888 A1* 7/2006 Hebrink .................. B32B 3/30
428/141
(Continued)

FOREIGN PATENT DOCUMENTS

JP 2000-238070 A 9/2000
JP 2001-347565 A 12/2001
(Continued)

*Primary Examiner* — Laura A Auer
*Assistant Examiner* — Ethan Weydemeyer
(74) *Attorney, Agent, or Firm* — DLA Piper LLP (US)

(57) ABSTRACT

A molding film is high in both windability during film production and also excellent in appearance quality and moldability. The molding film includes cyclic olefin based resin, has roughened regions in side edge parts of the molding film, is non-oriented, and satisfies (1) to (3): (1) one of the surfaces has a surface roughness SRa of 2 nm or more and 30 nm or less in the central region, which is defined as the region outside the roughened regions, whereas the other surface has a surface roughness SRa of 100 nm or more and 800 nm or less, (2) the ratio h/t where h represents the height (in μm) of the roughened regions while t represents the thickness (in μm) of the central region is 5/100 or more and 30/100 or less, and (3) the width of the roughened regions is 5 mm or more and 20 mm or less.

16 Claims, 2 Drawing Sheets

(51) Int. Cl.
*B32B 3/30* (2006.01)
*B32B 7/02* (2006.01)
*B32B 27/08* (2006.01)
*B32B 27/32* (2006.01)
*C08J 5/18* (2006.01)
*B29C 47/00* (2006.01)
*B29C 59/04* (2006.01)
*B29K 45/00* (2006.01)
*B29C 47/08* (2006.01)
*B29C 35/08* (2006.01)
*B29C 59/02* (2006.01)

(52) U.S. Cl.
CPC .......... *B29C 47/0021* (2013.01); *B29C 59/04* (2013.01); *B32B 3/02* (2013.01); *B32B 3/30* (2013.01); *B32B 7/02* (2013.01); *B32B 27/08* (2013.01); *B32B 27/325* (2013.01); *B29C 47/0898* (2013.01); *B29C 2035/0827* (2013.01); *B29C 2059/023* (2013.01); *B29K 2045/00* (2013.01); *B29K 2995/0074* (2013.01); *B32B 2250/02* (2013.01); *B32B 2250/242* (2013.01); *B32B 2307/538* (2013.01); *B32B 2419/00* (2013.01); *B32B 2457/00* (2013.01); *B32B 2605/00* (2013.01); *C08J 2323/02* (2013.01); *C08J 2345/00* (2013.01); *C08J 2423/06* (2013.01); *Y10T 428/1452* (2015.01); *Y10T 428/24355* (2015.01)

(58) Field of Classification Search
USPC ............ 264/173.11, 173.12, 173.14, 173.16, 264/173.17, 173.19; 428/41.3, 141
See application file for complete search history.

(56) References Cited

U.S. PATENT DOCUMENTS

| | | | |
|---|---|---|---|
| 2006/0198991 | A1* | 9/2006 | Takiyama .............. B29C 39/18 428/172 |
| 2006/0272768 | A1 | 12/2006 | Kitamura et al. |
| 2007/0166523 | A1* | 7/2007 | Fukaya .................. B29C 33/68 428/292.1 |
| 2014/0147666 | A1 | 5/2014 | Sakamoto et al. |
| 2014/0170379 | A1 | 6/2014 | Manabe et al. |

FOREIGN PATENT DOCUMENTS

| | | | | |
|---|---|---|---|---|
| JP | 2004-188708 | A | 7/2004 | |
| JP | 2005-162965 | A | 6/2005 | |
| JP | 2006-213012 | A | 8/2006 | |
| JP | 2006-257399 | A | 9/2006 | |
| JP | 2006-264136 | A | 10/2006 | |
| JP | 2010-024449 | A | 2/2010 | |
| JP | 2010-031252 | A | 2/2010 | |
| JP | 2011-224934 | A | 11/2011 | |
| JP | 2013-071419 | A | 4/2013 | |
| WO | WO 2009158036 | A2 * | 12/2009 | ............ B32B 33/00 |
| WO | 2012/035956 | A1 | 3/2012 | |
| WO | 2013/027547 | A1 | 2/2013 | |

\* cited by examiner

FILM FOR MOLDING

TECHNICAL FIELD

This disclosure relates to molding film that is high in both windability during film production and processing steps and transfer surface smoothness and also excellent in appearance quality and moldability.

BACKGROUND

As environmental consciousness has been enhanced in recent years, demands are increasing for solventless painting techniques and alternatives to plating effective for decoration of molded articles such as building materials, automobile parts, portable telephones, home electric appliances, and personal computers. In particular, the use of film in decoration methods has been widely practiced.

Against such a background, the use of biaxially stretched polyester film as a molding film designed to be processed by printing and molding has been proposed (see Japanese Unexamined Patent Publication (Kokai) No. 2001-347565). There are also proposals to use polyester, copolymerized polyester resin in particular, as a deep-draw moldable sheet that can be molded and decorated simultaneously since polyester is more suitable for low stress molding than polyethylene terephthalate (hereinafter occasionally referred to as PET) (see Japanese Unexamined Patent Publication (Kokai) No. 2000-238070). There are also proposals of film formed by attaching polyolefin film at least to one side of unstretched polyester film and designed for use as printable and coatable film material for transfer foil production (see Japanese Unexamined Patent Publication (Kokai) No. 2004-188708). In addition, special films such as mold releasing film and decorative film that are based on cyclic polyolefin resin have also been proposed (see Japanese Unexamined Patent Publication (Kokai) Nos. 2006-257399 and 2005-162965).

In addition to moldability, molding film is also required to have other characteristics. For example, film for transfer foil should have good appearance features including smoothness and glossiness on the transfer surface for coating with a decorating layer as a base film. In general, however, windability of a film during production and processing steps deteriorates if an attempt is made to produce a film with a smooth surface. Importance is attached to the smoothness of film surfaces in the field of optical applications as well as in the field of moldings, and some film production methods that can solve the above problem in the former field have been proposed including optical films processed by the so-called knurling technique (also referred as rouletting and embossing) that have a roughened part along the film edges to improve windability (see Japanese Unexamined Patent Publication (Kokai) No. 2011-224934).

The film described in JP '565, which is a biaxially oriented polyester film, is not sufficiently high in moldability at low temperatures, though high in heat resistance.

The film described in JP '070 is too low in solvent resistance to resist printing and coating.

The film described in JP '708 is based on polypropylene as the polyolefin component and, accordingly, is poor in appearance quality and cannot be applied to products that require a high degree of surface properties.

The films described in JP '399 and JP '965 are not designed with great care in terms of appearance quality and film processability.

Except for the film edge parts with a roughened surface part, the film described in JP '934 is not designed with great care in terms of windability of non-knurled parts in film production and processing steps.

It could therefore be helpful to provide molding film high in both windability during film production and processing steps and transfer surface smoothness and also excellent in appearance quality and moldability.

SUMMARY

We thus provide a molding film that includes cyclic olefin based resin as primary component, has roughened regions in side edge parts of the molding film, is non-oriented, and meets all of (1) to (3):

(1) one of the surfaces (hereinafter referred to as surface A) has a surface roughness SRa of 2 nm or more and 30 nm or less in the central region, which is defined as the region outside the roughened regions, whereas the other surface (hereinafter referred to as surface B) has a surface roughness SRa of 100 nm or more and 800 nm or less, (2) the ratio h/t where h represents the height (in μm) of the roughened regions while t represents the thickness (in μm) of the central region is 5/100 or more and 30/100 or less, and (3) the width of the roughened regions is 5 mm or more and 20 mm or less.

We thus provide a molding film high in both windability during film production and processing steps and transfer surface smoothness and also excellent in appearance quality and moldability.

More specifically, the film is high in both windability during film production and processing (such as coating) steps and transfer surface smoothness and also has excellent appearance quality and moldability when produced by various molding methods such as vacuum molding, air-pressure molding, and press molding. Accordingly, various molding methods can be applied to produce such film, and the film can be used favorably for decoration of molded components such as building materials, automobile components, portable telephones, home electric appliances, and personal computers.

EXPLANATION OF NUMERALS

Figure 1:
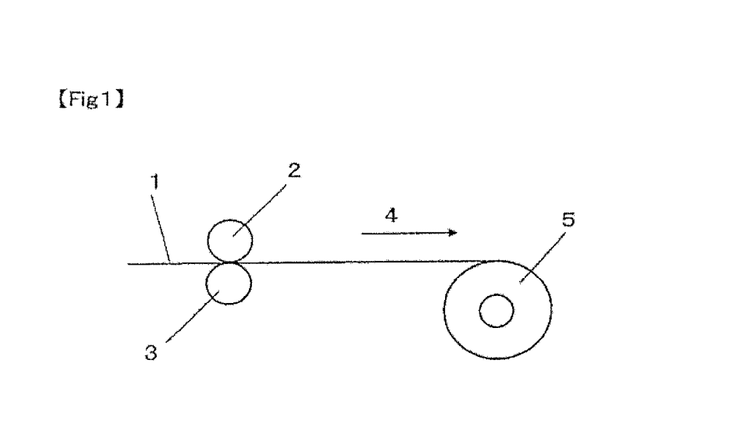
FIG. 1 is a schematic side view showing a method of forming roughened regions in the side edge parts of a film.
Figure 2:
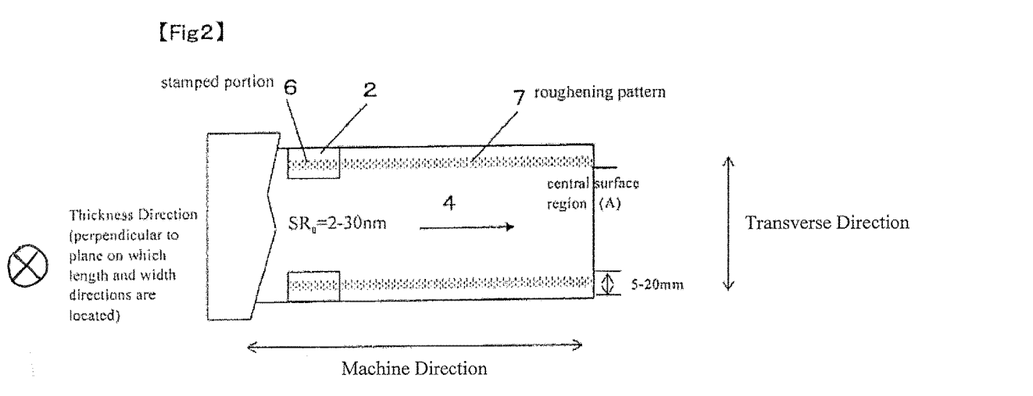
FIG. 2 is a schematic plan view showing the method of FIG. 1.
Figure 3:
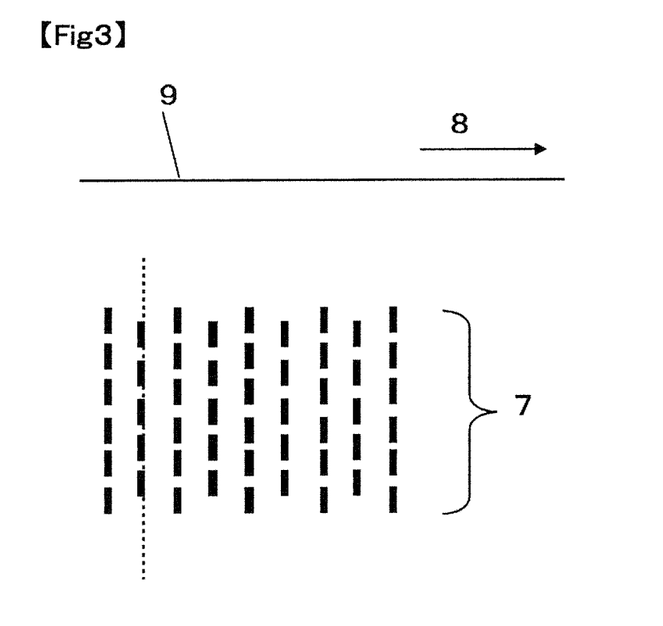
FIG. 3 is a schematic enlarged plan view illustrating a typical roughening pattern.
Figure 4:
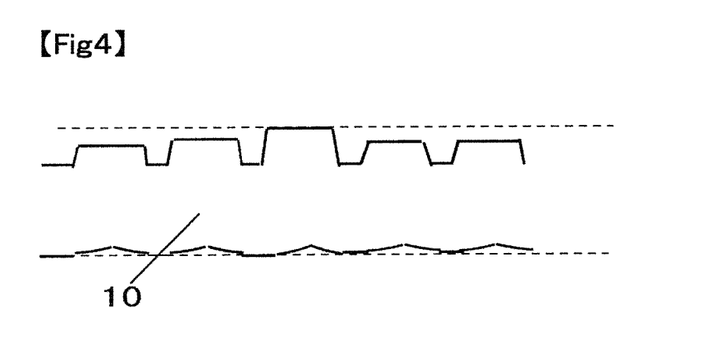
FIG. 4 is a schematic across-the-width cross-sectional view of the film of FIG. 3 cut along the dashed line.

1: film
2: die-stamped ring (protrusion-forming roll)
3: flat surface rolls (opposite roll)
4: film travel direction
5: film roll
6: stamped portion
7: roughening pattern
8: length direction of film
9: side edge of film 10: cross section (example) of roughened region in width direction of the film

DETAILED DESCRIPTION

The molding film is a non-oriented monolayer or multilayer film containing cyclic olefin based resin as primary component. A film containing cyclic olefin based resin as primary component is used so that in a process for decoration of a molding body, it will be possible to realize a high conformity to the mold when shaped into a molded body that requires deep-draw molding.

The expression "containing cyclic olefin based resin as primary component" means that the cyclic olefin based resin accounts for 50 mass % or more and 100 mass % or less of the total weight of all the components of the film, which accounts for 100 mass %. When the molding film is a multilayer film composed of two or more layers, the expression "containing cyclic olefin based resin as primary component" means that the total weight of the cyclic olefin based resin existing in the layers that constitute the multilayer film accounts for 50 mass % or more and 100 mass % or less of the total weight of all the components existing in the layers, which accounts for 100 mass %. When cyclic olefin based resin is contained as a primary component, furthermore, it is preferable for the total weight of the cyclic olefin based resin existing in the layers that constitute the film to account for 70 mass % or more and 100 mass % or less, more preferably 80 mass % or more and 100 mass % or less, and still more preferably 90 mass % or more and 100 mass % or less, of the total weight of all the components existing in the film, which accounts for 100 mass %.

In addition, the molding film is preferably a non-oriented film. If non-oriented, the film will suffer a less stress when stretched during molding and will be able to exhibit a high conformity to the mold when shaped into an article that requires deep-draw molding. A non-oriented film is defined as one having a plane orientation coefficient (fn) in the range of 0.00 to 0.05. A non-stretched film may be used as such a film with a plane orientation coefficient (fn) of 0.00 to 0.05. A non-stretched film may be slightly oriented in the machine direction (hereinafter referred to as length direction) as a result of drafting that occurs during film production and therefore, it is important to minimize the orientation even in an unstretched film to maintain a plane orientation coefficient of 0.00 to 0.05. The moldability may differ between the length direction and the width direction during molding if the plane orientation coefficient (fn) is more than 0.05. It is more preferably 0.00 to 0.03, still more preferably 0.00 to 0.02. The plane orientation coefficient (fn) is calculated by the following equation from the refractive indexes in the film's length direction, width direction, and thickness direction (Nx, Ny, and Nz, respectively) measured with an appropriate tool such as Abbe refractometer:

Plane orientation coefficient$(fn)=\{(Nx+Ny)/2\}-Nz$.

If the length direction or the width direction of a film is unknown, the plane orientation coefficient (fn) can be determined on the assumption that the direction with a maximum refractive index in the film plane is the length direction, that the direction perpendicular to the length direction in the film plane is the width direction, and that the direction perpendicular to the film plane is the thickness direction. Alternatively, the direction with a maximum refractive index in the film plane may be determined from refractive index measurements taken in all in-plane directions by using an Abbe refractometer or from, for example, the slow axis direction identified by using a phase difference measuring apparatus (such as birefringence measuring apparatus).

It is preferable for the molding film to have roughened regions in the side edge parts to ensure both a high windability during film production and processing steps and a high transfer surface smoothness. There are no specific limitations on the method used to form recesses and protrusions by knurling (also referred to rouletting or embossing), which is intended to produce roughened regions, or on the shape of the recesses and protrusions to be adopted, and generally known methods may be used. Such recesses and protrusions for roughening may be formed either on one side or on both sides of the film, but it is preferable for them to be formed on only one side to reduce the required cost for construction of a roller system. For example, a useful method of forming recesses and protrusions is to fit die-stamped rings (protrusion-forming rolls) having protrusions in the form of quadrangular pyramids, circular cones and the like, on flat surface rolls and cause the film to travel between these rolls. The die-stamped rings may be of such a material as carbon steel, stainless steel, ceramic coating, and hard chrome plating (hereinafter occasionally referred as HCr). There are no specific limitations on the shape of the die-stamped rings and the rings (rolls) may have an appropriately selected width, and protrusion intervals and height. There are no specific limitations on the material of the flat surface rolls and they may be of a material such as urethane rubber, stainless steel, ceramic coating, and HCr plating, of which an appropriate one may be selected to meet particular requirements. The recesses and protrusions for roughening may be formed either at room temperature or at an elevated temperature, but it is preferable for them to be formed at an elevated temperature to prevent deformation of edge portions of the film and abrasion powder of the film from being caused during the roughening process. To form roughened regions at an elevated temperature, commonly used methods include heating the die-stamped rings by an external heater, using die-stamped rings incorporating a heating device, using heated flat surface rolls, and heating the film before feeding it between die-stamped rings. When heating die-stamped rings or flat surface rolls, it is preferable for the die-stamped rolls to incorporate a temperature measuring device such as thermocouple for temperature control to realize a uniform temperature on the die-stamped rings and roll surfaces. The heating temperature is generally set in the temperature range from the glass transition temperature to the melting point of the resin. However, the molding film contains cyclic olefin based resin as primary component and may not have a definite melting point. In that case, the heating temperature is preferably between the glass transition temperature (hereinafter referred as Tg) and (Tg+120° C.), more preferably between (Tg+30° C.) and (Tg+110° C.), and most preferably between (Tg+50° C.) and (Tg+100° C.). If the heating temperature is lower than Tg, physical actions of the peripheral portions of the film associated with the formation of protrusions may cause deformation, particularly wavelike deformation in the side edges along both sides of the film. If the heating temperature is higher than (Tg+120° C.), the film may soften excessively and suffer thermal deformation in peripheral portions of the film due to heat used to form roughened regions. There are no specific limitations on the shapes of the recesses and protrusions in the roughened regions and typical shapes include, for example, parallel lines, diagonal lines, and embossed rings. The height of the roughened regions is defined as the height of the tallest of the protrusions.

The molding film preferably has roughened regions in both side edge parts of the film. If a roughened region is formed in the inner part, instead of the side edge parts, of the film, only a narrow portion of the film will be left for use as a product, leading to deterioration in terms of cost and yield. The term "a side edge part of a film" means the narrow part along either edge of the film with a width that accounts for 5% of the total width of the film. Each roughened region is preferably contained in either side edge part of the film, more preferably contained in either side edge part of the film with a width that accounts for 0.2% or more and 3.5% or less of the total width of the film. The central region is defined as the region outside the roughened regions, and the ratio h/t where h represents the height (in μm) of the roughened regions while t represents the thickness (in μm) of the central region is preferably 5/100 or more and 30/100 or less. In this case, the central region refers to the part of a film surface located between the zonal roughened regions that extend along both side edges of the film. If the ratio h/t is less than 5/100, it will be impossible to maintain a good balance between elimination and containment of the air taken in with the accompanying streams that occur when the film is wound up on a roll to form a core after roughened regions are produced. This causes roll shrinkage and possibly results in flaws and deterioration in the transfer surface smoothness that is defined in terms of the surface roughness (SRa) of the molding film as described later. If the ratio h/t is more than 30/100, an excessive amount of air will be taken in between layers in a film roll, possibly resulting in meandering, weaving, and creasing during the wind-up step. A roughened region is formed in each side edge part of the film and each roughened region preferably has a width of 5 mm or more and 20 mm or less. It is more preferably 7 mm or more and 15 mm or less. A plurality of protrusions are contained in the roughened region existing in each zonal side edge part of the film and the width of the roughened region is defined as the distance from the outer edge, i.e., the nearest edge to the film edge in the width direction, of the protrusion that is located outermost in the film's width direction to the inner edge, i.e., the nearest edge to the center, of the protrusion that is located innermost in the film's width direction. If the width of the roughened region is less than 5 mm, it will possibly lead to shrinkage of the film roll or flaws thereon. If the width of the roughened region is more than 20 mm, it will possibly lead to creasing during the film's wind-up step or a decrease in the portion of the film that is useful from the viewpoint of required cost. Furthermore, the roughened region may be divided partly in the film's length direction but should preferably be in a continuous belt-like shape.

The roughened regions may be produced during the film production process or the film may be first cut by a slitter into pieces with a width and length required for the intended product and then subjected to a dedicated step for producing protrusions. To simplify the film production process for cost production, die-stamped rings and flat surface rolls designed for roughening processing as described above may be installed in the intermediate product wind-up step and cutting step in the film production process, or die-stamped rolls may be attached to film conveyance rolls instead of flat surface rolls to perform roughening processing.

The thickness of the central region t, that is, the film thickness, is preferably 50 μm or more and 200 μm or less from the viewpoint of production stability, moldability, and processability. It is more preferably 75 μm or more and 150 μm or less. If the thickness of the central region t is less than 50 μm, it will possibly lead to a decrease in the rigidity and production stability of the film and creasing during molding.

If the thickness of the central region t is more than 200 μm, it will possibly lead to a decrease in handleability and moldability and an increase in material cost. For the molding film, furthermore, the thickness variation is preferably 10% or less from the viewpoint of moldability and processability. If the thickness variation is 10% or less, it will ensure uniform molding and serve to prevent significant variations in the effect of processing such as coating, lamination, printing, and vapor deposition. There are no specific limitations on the method used to control the thickness variation of the molding film at 10% or less, but typical methods include, for example, increasing the casting temperature to a degree where the film stays non-tacky, moving forward the casting position, and reducing the lip size of the mold. The thickness variation is still more preferably 8% or less and most preferably 5% or less.

The transfer surface (hereinafter referred to as surface A) is defined as the surface to be subjected to the decoration step for the central region of the molded body, that is, the region outside the roughened regions that are formed in the side edge parts of the film to ensure both a high windability during film production and processing steps and a high transfer surface smoothness. The surface roughness SRa of the transfer surface is preferably 2 nm or more and 30 nm or less. If SRa is more than 30 nm, the decorated film will fail to have a sufficiently smooth surface, possibly leading to a decorated molded body with poor surface appearance. The lower limit of SRa should be as low as possible from the viewpoint of surface appearance of the decorated surface, but it should be 2 nm or more to ensure a surface roughness that allows high-yield industrial production. The surface roughness SRa of surface A is preferably 2 nm or more and 20 nm or less, more preferably 2 nm or more and 10 nm or less. Furthermore, the surface (surface B) opposite to surface A which is to be subjected to decoration preferably has a surface roughness SRa of 100 nm or more and 800 nm or less. If the surface roughness SRa of surface B is more than 800 nm, the roll shrinkage that occurs during winding-up of the film into a film roll has an influence on the core part of the film roll such that the strain occurring in the embossed portion of surface B, which is high in surface roughness, causes a compression stress to the smooth opposite surface, i.e., surface A (hereinafter referred to as back attack phenomenon), possibly resulting in a decrease in the smoothness of surface A and a back attack deformation in the form of an undulating irregularity in surface A. Furthermore, a transfer foil produced by decorating surface A having an undulating irregularity may lead to a molded body with poor appearance after a mold transfer step. On the other hand, if the surface roughness SRa of surface B is less than 100 nm, the slip properties of the film may deteriorate during the molding film production step and the processing step for producing a decorated layer, and creasing and breakage may be caused during winding-up of the film, possibly failing to provide a film roll with good appearance. The surface roughness SRa of surface B is preferably 200 nm or more and 700 nm or less, more preferably 300 nm or more and 500 nm or less.

A typical method of controlling the surface roughness SRa of surface A at 2 nm or more and 30 nm or less is to extrude a sheet-like molten polymer from a T-die onto a casting roll with a smooth surface for cooling and solidification. The smooth surface of the casting roll is transferred to the cast film allowing the surface of the film in contact with the casting roll to have high smoothness.

In the above method, the arithmetic average roughness Ra of the surface of the casting roll as measured according to JIS B 0601 (2001) is preferably 50 nm or less, more preferably 40 nm or less, and still more preferably 20 nm or less. There are no specific limitations on the lower limit of the arithmetic average roughness Ra of the casting roll, but it is preferably 2 nm or more in view of the windability of the film into a roll. In regard to the surface roughness of the casting roll, a required surface roughness value may be obtained by using an appropriate grinding method selected from among the generally known ones, but it is preferable to perform a buffing step after the grinding step to control the surface quality accurately. A useful method of measuring the surface roughness of a casting roll is to apply an appropriate material such as triacetyl cellulose dissolved in an organic solvent to the roll surface and dry it to prepare a sample (replica sample) that represents the roll surface profile transferred to its surface, followed by measuring the surface roughness of the replica sample. Or the surface roughness of a roll may be measured directly with a surface roughness tester. Useful methods of transferring the smooth surface of the casting roll to the film more effectively to ensure an improved surface smoothness include bringing the film into strong contact with the casting roll by applying static electricity using a wire-like electrode; applying an air flow from an air knife or air chamber to cause strong contact with the roll; and extruding a sheet-like molten polymer through a T-die and nipping it between a pair of cooling rolls, namely a casting roll and a nip roll, followed by taking it up while maintaining strong contact with the casting roll.

On the other hand, useful methods of adjusting the surface roughness SRa of surface B to 100 nm or more and 800 nm or less include adding particles to the film material to produce a rough surface; causing the polymer to crystallize to form a rough surface while molding a film on the casting roll; and extruding a sheet-like molten polymer through a T-die and nipping it between a pair of cooling rolls, namely a casting roll and a nip roll, followed by taking it up while maintaining strong contact with the casting roll and at the same time causing an appropriately roughened surface of the nip roll to be transferred to the film surface.

It is preferable from the viewpoint of easy control of the surface roughness of the film to adopt a process in which a sheet-like molten polymer is extruded through a T-die and nipped between a pair of cooling rolls, namely a casting roll to form surface A and a nip roll to form surface B, followed by taking it up while maintaining strong contact with the casting roll and at the same time causing an appropriately roughened surface of the nip roll to be transferred to the film surface. There are no specific limitations on the materials of the casting roll and nip roll adopted to produce the film, but the roll surface used to form a smooth surface (surface A) is preferably of a metallic material while the roll surface used to form an emboss-like rough surface (surface B) intended for improved windability is preferably of rubber.

It should be noted that the cyclic olefin based resin is completely free of lubricants such as particles as a means of roughening the film surface. In general, adding particles to an input material to provide a film having a rough surface, or a slippery surface, is a conventionally known method, but it is preferable for the film to be free of particles because it may suffer surface defects as a result of particles falling off. When used for film molding in particular, particles tend to come off from the film surface as it is stretched during molding to cause surface defects, indicating that the film should be free of particles.

The molding film is preferably a multilayer film containing layer A and layer B and it is further preferable that layer A be composed primarily of a cyclic olefin copolymer resin (hereinafter referred to as COC) while layer B be composed primarily of a cyclic olefin polymer resin (hereinafter referred to as COP).

In a multilayer film containing layer A and layer B, it is preferable that the film contain layer B, layer A, and layer B stacked in this order and that layer A be composed primarily of a cyclic olefin copolymer resin (hereinafter occasionally referred to as COC) as described later. We found that a film with high moldability and a molded body with good surface appearance can be obtained when layer A is composed primarily of a COC. The expression "layer A contains a COC as primary component" means that the COC accounts for 50 mass % or more and 100 mass % or less of the total weight of all the components of layer A, which accounts for 100 mass %. More preferably, the COC accounts for 70 mass % or more and 100 mass % or less of the total weight of all the components of layer A, which accounts for 100 mass %. The COC accounts for 80 mass % or more and 100 mass % or less is still more preferable and the COC accounts for 90 mass % or more and 100 mass % or less is particularly preferable.

Furthermore, layer B is preferably composed primarily of a cyclic olefin polymer resin (hereinafter occasionally referred to as COP) as described later. We found that if layer B is composed primarily of a COP, a highly tear resistant molding film can be obtained while maintaining, for example, a high moldability in a molding process realized by the use of layer A and good surface appearance inherent in the molding film.

The expression "layer B contains a COP as primary component" means that the COP accounts for 50 mass % or more and 100 mass % or less of the total weight of all the components of layer B, which accounts for 100 mass %. More preferably, the COP accounts for 70 mass % or more and 100 mass % or less of the total weight of all the components of layer B, which accounts for 100 mass %. It accounts for 80 mass % or more and 100 mass % or less in a still more preferable example and accounts for 90 mass % or more and 100 mass % or less in a particularly preferable example.

The cyclic olefin polymer resin (COP) is a resin having a structure as produced by polymerizing only a repeating unit that contains a cyclic olefin in the backbone chain while the cyclic olefin copolymer resin (COC) is a resin having a structure as produced by polymerizing at least two or more repeating units one of which is a repeating unit containing a cyclic olefin in the backbone chain and the other of which is a repeating unit composed of an olefin but containing no cyclic olefin in the backbone chain (hereinafter, a repeating unit containing a cyclic olefin is occasionally referred to as cyclic olefin monomer).

The cyclic olefins that can constitute a COP or COC include monocyclic olefins such as cyclobutene, cyclopentene, cycloheptene, cyclooctene, cyclopentadiene, and 1,3-cyclohexadiene;

dicyclic olefins such as bicyclo[2,2,1]hept-2-ene, 5-methyl-bicyclo[2,2,1]hepta-2-ene, 5,5-dimethyl-bicyclo[2,2,1]hept-2-ene, 5-ethyl-bicyclo[2,2,1]hept-2-ene, 5-butyl-bicyclo[2,2,1]hept-2-ene, 5-octyl-bicyclo[2,2,1]hept-2-ene, 5-octadecyl-bicyclo[2,2,1]hept-2-ene, 5-methylidene-bicyclo[2,2,1]hept-2-ene, 5-vinyl-bicyclo[2,2,1]hept-2-ene, and 5-propenyl-bicyclo[2,2,1]hept-2-ene;

tricyclic olefins such as tricyclo[4,3,0,12.5]deca-3,7-diene, tricyclo[4,3,0,12.5]deca-3-ene, tricyclo[4,3,0,12.5]undeca-3,7-diene, tricyclo[4,3,0,12.5]undeca-3,8-diene, tricyclo[4,3,0,12.5]undeca-3-ene in the form of a partially hydrogenated compound (or cyclopentadiene- or cyclohexene-addition product) thereof, 5-cyclopentyl-bicyclo[2,2,1]hept-2-ene, 5-cyclohexyl-bicyclo[2,2,1]hept-2-ene, 5-cyclohexenyl bicyclo[2,2,1]hept-2-ene, and 5-phenyl-bicyclo[2,2,1]hepta-2-ene;

tetracyclic olefins such as tetracyclo[4,4,0,12.5,17.10]dodeca-3-ene, 8-methyltetracyclo[4,4,0,12.5,17.10]dodeca-3-ene, 8-ethyltetracyclo[4,4,0,12.5,17.10]dodeca-3-ene, 8-methylidene tetracyclo[4,4,0,12.5,17.10]dodeca-3-ene, 8-ethylidene tetracyclo[4,4,0,12.5,17.10]dodeca-3-ene, 8-vinyltetracyclo[4,4,0,12.5,17.10]dodeca-3-ene, and 8-propenyl-tetracyclo[4,4,0,12.5, 17.10]dodeca-3-ene; and tetrameric polycyclic olefins such as 8-cyclopentyl-tetracyclo[4,4,0,12.5,17.10]dodeca-3-ene, 8-cyclohexyl-tetracyclo[4,4,0,12.5,17.10]dodeca-3-ene, 8-cyclohexenyl-tetracyclo[4,4,12.5, 17.10]dodeca-3-ene, 8-phenyl-cyclopentyl-tetracyclo[4,4,0,12.5,17.10]dodeca-3-ene, tetracyclo[7,4,13.6,01.9,02.7]tetradeca-4,9,11,13-tetraene, tetracyclo[8,4,14.7,01.10,03.8]pentadeca-5,10,12,14-tetraene, pentacyclo[6,6,13.6,02.7,09.14]-4-hexadecene, pentacyclo[6,5,1,13.6,02.7,09.13]-4-pentadecene, pentacyclo[7,4,0,02.7,13.6,110.13]-4-pentadecene, heptacyclo[8,7,0,12.9, 14.7,111.17,03.8,012.16]-5-eicosene, and heptacyclo[8,7,0,12.9,03.8,14.7,012.17,113.16]-14-eicosene.

These cyclic olefins may be used singly or as a combination of two or more thereof.

Of the above, those cyclic olefins preferred for COPs and COCs from the viewpoint of productivity and surface properties include tricyclic olefins containing 10 carbon atoms (hereinafter referred to as tricyclodecenes) such as bicyclo[2,2,1]hept-2-ene (hereinafter referred to as norbornene) and tricyclo[4,3,0,12.5]deca-3-ene; tetracyclic olefins containing 12 carbon atoms (hereinafter referred to as tetracyclododecenes) such as tetracyclo[4,4,0,12.5,17.10]dodeca-3-ene; and others such as cyclopentadiene and 1,3-cyclohexadiene.

For COP production, generally known methods are available including ring opening polymerization and addition polymerization of cyclic olefin monomers and useful processes include, for example, subjecting norbornene, tricyclodecene, tetracyclododecene, and derivatives thereof to ring opening metathesis polymerization, followed by hydrogenation; subjecting norbornene and derivatives thereof to addition polymerization; subjecting a cyclopentadiene and cyclohexadiene to 1,2- and 1,4-addition polymerization, followed by hydrogenation.

From the viewpoint of productivity, surface properties, and moldability, a highly suitable COP can be produced by subjecting a norbornene, tricyclodecene, tetracyclododecene, and derivatives thereof to ring opening metathesis polymerization, followed by hydrogenation.

The repeating unit composed of an olefin but containing no cyclic olefin in the backbone chain used for a COC may have a cyclic olefin segment in a side chain or may not have a cyclic olefin segment in a side chain, but from the viewpoint of productivity and cost, the adoption of an example that does not include a cyclic olefin segment in a side chain, or so-called chain olefin, is preferable. Preferred chain olefin include ethlene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosen. Of these, the use of ethylene is particularly preferable from the viewpoint of productivity and cost.

For COC production, there are generally known methods including addition polymerization of a cyclic olefin monomer and a chain olefin monomer, and typical processes include, for example, addition copolymerization of norbornene and derivatives thereof to ethylene.

In regard to the mass ratio between the repeating unit containing a cyclic olefin in the backbone chain and the a repeating unit composed mainly of an olefin but containing no cyclic olefin in the backbone chain in a COC, it is preferable that the ratio of the repeating unit containing a cyclic olefin in the backbone chain to the a repeating unit composed mainly of an olefin but containing no cyclic olefin in the backbone chain be 60/40 to 85/15, more preferably 65/35 to 80/20. If the proportion of the repeating unit containing a cyclic olefin in the backbone chain in a COC is less than 60 mass %, its glass transition temperature will be low, possibly leading to an insufficient heat resistance. If the proportion of the repeating unit containing a cyclic olefin in the backbone chain in a COC is more than 85 mass %, on the other hand, it will possibly not be sufficiently high in moldability and tear resistance.

Most preferably, the COC should be a copolymer of norbornene and ethylene from the viewpoint of productivity, surface properties, and moldability.

The COC and COP may contain a polar group with the aim of providing a film that maintains strong contact with a coat layer. Such polar groups include, for example, carboxyl group, anhydride group, epoxy group, amide group, ester group, and hydroxyl group, and a useful method to produce a COC or COP containing a polar group is to carry out graft polymerization and/or copolymerization of an unsaturated compound containing a polar group. Such unsaturated compounds containing a polar group include (meth)acrylic acid, maleic acid, maleic anhydride, itaconic anhydride, glycidyl (meth)acrylate, (meth)acrylic acid alkyl (containing 1 to 10 carbon atoms) ester, maleic acid alkyl (containing 1 to 10 carbon atoms) ester, (meth)acrylamide, and (meth)acrylic acid 2-hydroxyethyl.

Layer A and layer B may be composed only of a COC or a COP as primary component, or may contain another olefin based resin, or may contain a resin other than olefin based resins, as long as layer A is composed primarily of a COC while layer B is composed primarily of a COP.

Such olefin based resins other than the COCs and COPs include, for example, various polyethylene based resins such as low density polyethylene, medium density polyethylene, high density polyethylene, linear low density polyethylene, and ethylene-α olefin copolymers polymerized with a metacellon catalyst; various polypropylene based resins such as polypropylene, ethylene-propylene copolymers, and ethylene-propylene-butene copolymers, and polyolefin based resins such as methyl pentene polymer. Also useful are polymers composed of α-olefin monomers such as ethylene, propylene, butene-1, pentene-1,4-methyl pentene-1, hexene-1, and octene-1 as well as block copolymers composed of these α-olefin monomers. In particular, from the viewpoint of the compatibility with COCs and/or COPs, preferable olefin based resins other than COCs and COPs include various polyethylene based resins and various polypropylene based resins.

It is preferable to add a polyethylene based resin or polypropylene based resin because it decreases the shear stress that occurs in the extrusion step, reduces generation of foreign matter due to crosslinking, and prevents inherent brittleness of COCs and COPs.

On the other hand, an increase in the content of the polyethylene based resin or polypropylene based can lead to a deterioration in self-holding properties, a decline in surface appearance and transparency of the multilayer film, and a debasement in the surface appearance of the molding body.

From the viewpoint of surface appearance, processability, tear resistance, and self-holding properties, the total content of the polyethylene based resin and/or polypropylene based resin is preferably 1 mass % or more and 40 mass % or less, more preferably 1 mass % or more and 30 mass % or less, and most preferably 1 mass % or more and 20 mass % or less, of the entire film, which represents 100 mass %. When the film contains both polyethylene based resin and polypropylene based resin, the term "total content of the polyethylene based resin and/or polypropylene based resin" refers to the sum of their contents. If the molding film is a multilayer film containing two or more layers, the expression "the total content of the polyethylene based resin and/or polypropylene based resin is 1 mass % or more and 40 mass % or less of the entire film, which represents 100 mass %" assumes that the entire film means the total mass of the layers and that the total content is the sum of the contents of the polyethylene based resin and polypropylene based resin in the layers.

When comparing polyethylene based resin and polypropylene based resin, the use of polyethylene based resin is preferable from the viewpoint of the compatibility with a cyclic olefin based resin and in particular, it is more preferable to use high density polyethylene or linear low density polyethylene, most preferably linear polyethylene.

The term "polyethylene based resin" means a polymer in which the total quantity of ethylene-derived components accounts for 50 mass % or more and 100 mass % or less of the entire polymer, which accounts for 100 mass %. It should also be noted that for this disclosure, the term "polypropylene based resin" means a polymer in which the total quantity of propylene-derived components accounts for 50 mass % or more and 100 mass % or less of the entire polymer, which accounts for 100 mass %.

It is preferable for layer A (COC), which is contained in the multilayer film, to have a glass transition temperature of 70° C. or more and 140° C. or less from the viewpoint of the dimensional stability and moldability during processing. If the glass transition temperature of layer A is less than 70° C., the dimensional changes of the molding film may not be depressed sufficiently during various processing steps such as coating, laminate, printing, and deposition, leading to a processed film with a low planarity. If the glass transition temperature of layer A is more than 140° C., on the other hand, the molding film may fail to have a sufficiently high moldability.

To be still higher in both dimensional stability and moldability, layer A preferably has a glass transition temperature of 80° C. or more and 130° C. or less, particularly preferably 90° C. or more and 120° C. or less. It layer A has a plurality of glass transition temperatures, the highest glass transition temperature should be adopted.

When a copolymer of norbornene and ethylene is used as the COC, for example, layer A is allowed to have a glass transition temperature of 70° C. or more and 140° C. or less by increasing the content of the norbornene in layer A slowly to adjust the glass transition temperature. Furthermore, the glass transition temperature of layer A can also be adjusted by blending two COCs that have different norbornene contents.

It is preferable for layer B (COP), which is contained in the multilayer film, to have a glass transition temperature of 70° C. or more and 140° C. or less from the viewpoint of the dimensional stability and moldability during processing. If the glass transition temperature of layer B is less than 70° C., the molding film may fail to have a sufficiently high dimensional stability during processing steps such as coating, lamination, printing, and deposition. If the glass transition temperature of layer B is more than 140° C., on the other hand, the molding film may fail to have a sufficiently high moldability.

To be still higher in both dimensional stability and moldability, layer B preferably has a glass transition temperature of 80° C. or more and 130° C. or less, particularly preferably 90° C. or more and 120° C. or less. If layer B has a plurality of glass transition temperatures, the highest glass transition temperature should be adopted.

When a resin produced by subjecting norbornene, tricyclodecene, tetracyclododecene, and derivatives thereof to ring opening metathesis polymerization and subsequent hydrogenation is used as the COP, for example, layer B can be allowed to have a glass transition temperature of 70° C. or more and 140° C. or less by increasing the molecular weights of the cyclic olefins (norbornene, tricyclodecene, tetracyclododecene, and derivatives thereof) to be polymerized or increasing the number of rings to form a rigid structure to adjust the glass transition temperature. Furthermore, the glass transition temperature of the film can also be adjusted by blending two COPs that differ in glass transition temperature. When the molding film is a multilayer film, the glass transition temperature of layer B is preferably higher than the glass transition temperature of layer A to ensure both a high dimensional stability and a high moldability. This constitution allows layer B to have a high dimensional stability and a high releasability while allowing layer A to have a high moldability.

When the molding film is a multilayer film, it preferably has both layer A and layer B. High appearance quality and moldability can be achieved if both layer A and layer B exist and meet the requirements imposed separately on them. From the viewpoint of transparency, self-holding properties, and surface appearance, the stacking ratio (total thickness of layer B/total thickness of film (=thickness of central region, t)) is preferably 0.2 to 0.7. The stacking ratio of a film can be determined by observing the cross section of the film by scanning electron microscopy, transmission electron microscopy, optical microscopy and the like. From the viewpoint of handleability (depression of curling), the multilayer film preferably has a three-layer structure containing layer B, layer A, and layer B, instead of the two layers of layer A and layer B, and in particular, it is preferable for layer B, layer A, and layer B to be directly stacked in this order in the three-layer structure.

When the molding film is a monolayer film, it preferably has a glass transition temperature of 70° C. or more and 140° C. or less from the viewpoint of the dimensional stability and moldability during processing, as in layer A (COC) or layer B (COP) in the multilayer film described above.

The molding film may contain an antioxidant, antistatic agent, flame retardant, thermal stabilizer, ultraviolet absorber, plasticizer, tackifier, antifoam agent, and coloring agent (such as pigment or dye) in appropriate amounts as required.

Having good appearance quality and high moldability, the molding film can exhibit high conformity to the mold when used to produce a molded body in a deep-drawing process and, accordingly, it is preferred particularly as base film of a transfer foil in a process of manufacturing decorated moldings. If a decorating layer is formed on the transfer-surface-side of the molding film and transferred to the molding body (the body to be transfer-decorated) while it is molded, the molded body will have a decorating layer with good surface appearance since the decorating layer can be peeled easily from the molding film. There are no specific limitations on the constitution of the transfer foil, but it preferably contains the molding film covered with a decorating layer. The decorating layer is one designed to impart decorative features such as color, pattern, woodtone, metal-tone, and pearl-tone. After the transfer, the surface is preferably covered additionally with a clear layer from the viewpoint of scratch resistance, weather resistance, and design characteristics of the molded body. In this case, it is preferable for the clear layer to be located on the molding-film side. The molding film itself has releasability, but if the releasability from the clear layer is not sufficiently high due to material compatibility between the molding film and the clear layer, the molding film may be coated with a generally known release material.

As the minimum requirement, the transfer foil includes a molding film having a clear layer, decorating layer, and adhesive layer stacked in this order on at least one side thereof. It is preferable to provide an adhesive layer to ensure strong adhesion between the molding body (the body to be transfer-decorated) and the decorating layer after the transfer step. In this case, it is preferable for the adhesive layer to be located on the molded body (the body to be transfer-decorated).

Preferably, the transfer foil may have such a structure as the molding film (release layer)/clear layer/decorating layer/adhesive layer. The clear layer referred to herein is located outermost of the molded body to impart scratch resistance, weather resistance, and design characteristics to the molded body after the transfer step. The decorating layer is one designed to impart decorative features such as color, pattern, woodtone, metal-tone, and pearl-tone.

There are no specific limitations on the resin used in the clear layer as long as it is a highly transparent resin, but the use of a thermosetting resin or a light or ultraviolet curable resin is preferred from the viewpoint of scratch resistance. Such thermosetting resins include, for example, thermosetting acrylic resin, phenoxy resin, and epoxy resin and such light or ultraviolet curable resins include, for example, urethane acrylate resin, polyester acrylate resin, unsaturated polyester resin, silicone acrylate resin, and epoxy acrylate resin. These resins may contain a photopolymerization initiator, curing agent, curing accelerator, binding agent, surface adjustor, pigment, plasticizer, ultraviolet absorber, ultraviolet reflector, and photostabilizer as required. The resin used in the clear layer may be a copolymer or a mixture of a plurality of resins. If a light or ultraviolet curable resin is used, it is preferable to perform curing treatment after molding to allow the transfer foil to have a high moldability.

The clear layer, furthermore, preferably has a thickness of 10 to 100 µm, more preferably 15 to 80 µm, and most preferably 20 to 60 µm, from the viewpoint of scratch resistance and design characteristics.

Useful production methods for the clear layer include a method in which the molding film is directly coated and a method in which the layer is first formed on a carrier film followed by transfer. If drying has to be performed at a high temperature after forming the clear layer, the method in which the layer is first formed on a carrier film followed by transfer is preferred. Useful formation method for the clear layer include roller coating, brush coating, spray coating, immersion coating, gravure coater, die coating, comma coating, bar coating, and knife coating.

There are no specific limitations on the formation method for the decorating layer and useful ones include, for example, coating, printing, and metal deposition. If it is formed by coating, useful coating methods include gravure coating, roll coating, and comma coating. If it is formed by printing, useful printing methods include offset printing, gravure printing, and screen printing. In this case, preferred resins include polyester based resin, polyolefin based resin, acrylate based resin, urethane based resin, fluorine based resin, polyvinyl acetate based resin, vinyl chloride-vinyl acetate copolymer based resin, and ethylene-vinyl acetate copolymer based resin. There are no specific limitations on the coloring agent to be use, and an appropriate one may be selected from among various dyes, inorganic pigments, and organic pigments from the viewpoint of dispersibility and the like.

The decorating layer formed by coating or printing preferably has a thickness of 10 to 100 µm, more preferably 15 to 80 µm, and most preferably 20 to 60 µm, from the viewpoint of color retention and design characteristics after molding.

The material of the adhesive layer designed to impart adhesiveness to the molding body (the body to be transfer-decorated) may be of a thermosensitive type or a pressure-sensitive type. If a resinous molding body produced by injection molding, for example, is used as the molding body (the body to be transfer-decorated), the adhesive layer to be formed in the transfer foil to be transferred to it can be designed according to the material properties of the resinous molding body to be used. If the resinous molding body is of an acrylate based resin, for example, it is preferable to use an acrylate based resin, polyphenylene oxide-polystyrene based resin, polycarbonate based resin, or styrene copolymer based resin whereas if it is of a polystyrene based resin, preferable resins include acrylate based resin, polystyrene based resin, and polyamide based resin that have affinity therewith. If the resinous molding body is of a polypropylene based resin, it is preferable to use a chlorinated polyolefin resin, chlorinated ethylene-vinyl acetate copolymer based resin, cyclized rubber, or coumarone-indene based resin.

There are no specific limitations on the production method to be used to form the adhesive layer, and useful methods include, for example, coating techniques such as roll coating, gravure coating, and comma coating, and printing techniques such as gravure printing and screen printing. There are no specific limitations on the molding body (the body to be transfer-decorated) to be decorated by using a transfer foil produced from the molding film, and useful materials include, for example, metals as well as resins such as polypropylene, acrylic, polystyrene, polyacrylonitrile-styrene, and polyacrylonitrile-butadiene-styrene.

The molding film is high in windability in the film production and processing steps and accordingly, the film is conveyed in favorable conditions, leading to a film roll with good appearance. A film roll as referred to above is the molding film wound up on a core of paper, plastics and the like. Specifically, it may be a roll of a product (or intermediate) wound up by a winder during the film production process, a roll of a product cut to a required width by a slitter after film production, or a roll of a product coated by various methods in processing steps.

EXAMPLES

Our films and methods will be illustrated below in greater detail with reference to examples, but it should be understood that this disclosure is not construed as being limited thereto. The methods used to determine various characteristics are as follows.

(1) Surface Roughness SRa

Based on the surface roughness Ra specified in JIS B 0601 (2001), the surface roughness SRa of a film was determined using a ETB-30HK three dimensional surface roughness gauge manufactured by Kosaka Laboratory Ltd. in the stylus mode under the following conditions:

Stylus end diameter 2 μm, stylus load 10 mg, measuring length 1 mm, feeding pitch 50 μm, number of measuring lines 40, and cutoff value 0.25 mm.

From a roughness curve f(x,y) obtained under these conditions, SRa is calculated by Equation (1):

$$SRa = \frac{1}{S_M} \int_0^{Lx} \int_0^{Ly} \{f(x, y)\} dx, dy \qquad (1)$$

$$S_M = Lx \times Ly$$

1x; measuring length=1 mm, 1y=(feeding pitch)×(number of measuring lines)=2 mm, S=1x×1y.

(2) Glass Transition Temperature

Measurement and analysis were carried out according to JIS K 7121 (1987) and JIS K 7122 (1987) using a differential scanning calorimeter (RDC220, manufactured by Seico Electronics industrial Co., Ltd.).

A 5 mg film sample (to evaluate a specific layer of a film, 5 mg of the layer to be examined was scraped out) was heated from 25° C. up to 300° C. at a rate of 20° C./min and the change in specific heat caused by transition from a glass state to a rubber state was measured. Then, two straight lines were extended from the baselines and the glass transition temperature, namely the midpoint glass transition temperature, was determined from the point of intersection between the straight line that is equidistant in the longitudinal axis direction (the axis representing heat) from the former two straight lines and the step-like transition portion of the curve. If a plurality of glass transition temperatures were found, the highest glass transition temperature was adopted.

(3) Film Thickness (=Thickness of the Central Region t)

Measurements were taken at 10 points at regular intervals in the width direction of the film (=central region) using a μ-Mate M-30 digital micrometer manufactured by Sony Precision Technology, Inc., and their average was adopted as measured thickness.

(4) Thickness of Roughened Regions

The thickness of the roughened regions in the side edge parts of the film was measured at a total of 20 points (10 points in each of side edge parts extending 1 m in the length direction) using a μ-Mate M-30 digital micrometer manufactured by Sony Precision Technology, Inc., and their average was adopted as measured thickness.

(5) Height h of Roughened Regions

The difference between (3) the thickness of the central region t and (4) the thickness of the roughened regions was adopted as the height h of the roughened regions.

(6) Thickness of Each Layer of Film

To examine the thickness of each layer of a multilayer film, a Leica DMLM metallurgical microscope manufactured by Leica Microsystems was used to photograph the cross section of the film under transmitted light at a magnification of 100 times. In the photograph taken, thickness was measured at five arbitrarily selected points for each layer of the multilayer film and their average was adopted as the thickness of each layer.

(7) Width of Roughened Regions

Using a metallic scale, the width of the roughened region in each side edge part was measured at a total of 10 points (5 points along each edge) and their average was adopted as measured width.

(8) Windability

In the wind-up step in the film production process, the conditions of the film being conveyed and the surface of the film wound up into a roll were observed and the windability was evaluated according to the following criteria:

A: The film is conveyed in very good conditions and visual observation shows that the roll of wound-up film is completely free of creases, flaws, recesses, or convex deformation.

B: The film is conveyed in good conditions and visual observation shows that the roll of wound-up film is almost free of creases, flaws, recesses, or convex deformation.

C: The film is conveyed in good conditions, but visual observation shows that the roll of wound-up film has practically insignificant creases, flaws, recesses, or convex deformation.

D: The film is conveyed in poor conditions and visual observation shows that the roll of wound-up film has significant creases, flaws, recesses, or convex deformation.

(9) Transfer Surface Smoothness

A 10 cm×10 cm test piece was cut out of a film and pasted on black paper, and the surface (surface A) of the test piece was observed under a fluorescent lamp, followed by evaluation according to the following criteria:

A: Very high in surface gloss and no irregularities found in visual observation.

B: High in surface gloss and almost no irregularities found in visual observation.

C: Slight wavy irregularities on the surface found in visual observation, though at a practically insignificant level.

D: Significant wavy irregularities on the surface found in visual observation (10) Moldability A 200 mm×300 mm test piece was cut out from an arbitrary position of a film. An ultraviolet curable acrylate based resin (Laromer (registered trademark) LR8983, manufactured by BASF Japan Ltd.) was applied with an applicator to the surface of the test piece (surface-A side), followed by drying at 80° C. for 10 minutes to form a clear layer with a coat thickness of 50 μm. On the clear layer, an acrylate/urethane based silver ink was applied with an applicator, followed by drying at 80° C. for 10 minutes to form a decorating layer with a coat thickness of 30 μm. On the decorating layer, 892L manufactured by Japan Chemical Industries Co., Ltd. was applied with an applicator, followed by drying at 80° C. for 10 minutes to form an adhesive layer with a coat thickness of 20 μm, thus providing a transfer foil. The resulting transfer foil was heated at a temperature of 120° C. using a three dimensional vacuum-heating molding machine (NGF-0406-T, TOM process) manufactured by Fu-se Vacuum Forming Co., Ltd. and fed along a cylindrical resin mold made of polypropylene (diameter of bottom face 150 mm) heated at 50° C. to perform vacuum-pressure molding (pressure 0.2 MPa) to provide a molded body composed of a molding film/clear layer/decorating layer/adhesive layer/resin mold of polypropylene. The resulting molded body was evaluated in terms of the conditions (drawing ratio=height of molded body/diameter of bottom face) after molding along the mold according to the following criteria. The test piece is acceptable if ranked as S, A, B, or C.
- S: Able to be molded to a drawing ratio of 1.0 or more
- A: Able to be molded to a drawing ratio of 0.9 or more and less than 1.0
- B: Able to be molded to a drawing ratio of 0.8 or more and less than 0.9
- C: Able to be molded to a drawing ratio of 0.7 or more and less than 0.8
- D: Unable to be molded to a drawing ratio of 0.7

(11) Surface Appearance of Molded Body

UF-TCI-1 manufactured by Kyoeisha Chemical Co., Ltd. was applied with a die coater to surface-A side of a film roll, followed by drying at 80° C. for 10 minutes to form a clear layer with a coat thickness of 50 μm. Subsequently, an acrylate/urethane based silver ink was applied to the clear layer with the same applicator, followed by drying at 80° C. for 10 minutes to form a decorating layer with a coat thickness of 30 μm. On the decorating layer, furthermore, 892L manufactured by Japan Chemical Industries Co., Ltd. was applied with an applicator, followed by drying at 80° C. for 10 minutes to form a roll of transfer foil with a coat thickness of 20 μm. A 200 mm×300 mm position was cut out from an arbitrary position of the resulting roll of transfer foil and vacuum-pressure molding was performed as in (10) to provide a molded body composed of a molding film/clear layer/decorating layer/adhesive layer/resin mold of polypropylene. The resulting molded body was exposed to ultraviolet ray up to an irradiation intensity of 2,000 mJ/cm$^2$ to cure the coating material. The surface of the transfer body (clear layer/decorating layer/adhesive layer/resin mold of polypropylene) in a part where the molding film had been peeled was observed and the surface appearance was evaluated according to the following criteria:
- S: The surface had very high gloss and reflected the contour of the fluorescent lamp very clearly.
- S: The surface had high gloss and reflected the contour of the fluorescent lamp fairly clearly.
- B: The surface had wavy irregularities in some portions, but except for this, reflected the contour of the fluorescent lamp fairly clearly.
- C: The surface had wavy irregularities and reflected the contour of the fluorescent lamp slightly vaguely, though at a practically acceptable level.
- D: The surface had wavy irregularities and the contour of the fluorescent lamp was nearly invisible.

(12) Overall Evaluation

Overall evaluation was made according to the following criteria:
- AA: The sample was not ranked as B, C, or D for any of the evaluation items and ranked as A (or S) for all items.
- BB: The sample was not ranked as C or D for any of the evaluation items, but ranked as B for one or more evaluation items.
- CC: The sample was not ranked as D for any of the evaluation items, but ranked as C for one or more evaluation items.
- DD: The sample was ranked as D for one or more evaluation items.

Cyclic Olefin Copolymer Resin A (COC-A)

TOPAS 8007F-04 (ethylene-norbornene based copolymer in which norbornene accounts for 65 mass %) manufactured by Polyplastics Co., Ltd. was used.

Cyclic Olefin Copolymer Resin B (COC-B)

TOPAS 6013F-04 (ethylene-norbornene based copolymer in which norbornene accounts for 76 mass %) manufactured by Polyplastics Co., Ltd. was used.

Cyclic Olefin Resin C (COP-C)

Zeonor 1060R (a resin produced by subjecting cyclic olefin and/or derivative thereof to ring opening metathesis polymerization, followed by hydrogenation) manufactured by Zeon Corporation was used.

Polyethylene Based Resin D (PE-D)

Evolue SP2540 manufactured by Prime Polymer Co., Ltd. was used.

Example 1

For the purpose of producing a three layer structure of layer B/layer A/layer B in which each layer accounts for a proportion as shown in Table 1, each material was fed to a single screw extruder (L/D=28) and melted by heating, for both layer A side and layer B side, at a temperature of 240° C. in the supply zone and at 250° C. in the subsequent zones, sent to pass through a leaf disk filter with a filtration accuracy of 30 μm, stacked to form a multilayer structure of layer B/layer A/layer B (for thickness ratio of stacked layers, see Table) in a feed block installed in the top portion of the die, and discharged from a T-die (lip gap 0.4 mm) into between a mirror-finished casting roll (surface roughness 0.2 s) controlled at a temperature of 50° C. and a rubber roll (surface roughness Ra 0.4 μm) controlled at a temperature of 40° C. so that a sheet would be formed and nipped between the rolls, and then the sheet was cooled on a mirror-finished roll controlled at a temperature of 25° C. and, in a wind-up step, sent to pass between rolls each consisting of a heated die-stamped ring and a flat surface roll to produce roughened regions of a parallel line pattern extending in a belt shape in the length direction along each side edge of the film, followed by operating an aerial cutter to cut out both edge portions of the intermediate film and winding up the film with a thickness of 100 μm to provide a molding film with a width of 1,000 mm and a length of 500 m. Table 1 summarizes characteristics and evaluation results of the films thus obtained and transfer foils produced therefrom, showing that they are high in windability, transfer surface smoothness, moldability, and molding body's surface appearance.

Examples 2 and 3

With the same component ratio as in Example 1, films were prepared using rubber nip rolls that differ in surface roughness, and transfer foils were produced from those films. Table 1 shows measurements of the surface roughness SRa of the central region of surface A and surface B, indicating that good evaluation results were obtained.

Examples 4 to 8

With the same component ratio as in Example 1, films differing in the thickness of the central region t (Examples 4 and 5), height of roughened regions h, and width of roughened regions were prepared, and transfer foils were produced from those films. They had good characteristics and gave good evaluation results, as shown in Tables 1 and 2.

Examples 9 and 10

Except for using the layer compositions given in Example 2 and producing a monolayer film in Example 10, the same procedure as in Example 1 was carried out to provide our molding films and transfer foils were produced therefrom. They had good characteristics and gave good evaluation results, as shown in Table 2.

Comparative Examples 1 and 2

With the same component ratio as in Example 1, films were prepared using rubber nip rolls differing in surface roughness, and transfer foils were produced from those films. Table 3 shows measurements of the surface roughness SRa in the central region of surface A and surface B, indicating that windability was low in Comparative Example 1 whereas the transfer surface had low smoothness and the molding body had poor surface appearance in Comparative Example 2, resulting in a rank of DD in overall evaluation.

Comparative Examples 3 and 4

With the same component ratio as in Example 1, films differing in the height of roughened regions h and width of roughened regions were prepared and transfer foils were produced from those films. As seen from Table 3, windability was low in both Comparative Examples 3 and 4, resulting in a rank of CC in overall evaluation.

Comparative Example 5

With the same component ratio as in Example 1, a film having no roughened regions in the side edge portions was prepared, and transfer foils were produced from the film. Table 3 shows a poor windability, low smoothness of the transfer surface, and poor surface appearance of the molding body, resulting in a rank of DD in overall evaluation.

TABLE 1

| | | Example 1 | Example 2 | Example 3 | Example 4 | Example 5 |
|---|---|---|---|---|---|---|
| Structure | layer constitution | layer B/layer A/ layer B | layer B/layer A/ layer B | layer B/layer A/ layer B | layer B/layer A/ layer B | layer B/layer A/ layer B |
| | layer thickness (μm) | 17/66/17 | 17/66/17 | 17/66/17 | 12/51/12 | 8/34/8 |
| | stacking ratio (total thickness of layer B/thickness of central region t) | 0.34 | 0.34 | 0.34 | 0.32 | 0.32 |
| Layer A (inner layer) | components (mass %) | COC-A (65 mass %) COC-B (30 mass %) PE-D (5 mass %) | COC-A (65 mass %) COC-B (30 mass %) PE-D (5 mass %) | COC-A (65 mass %) COC-B (30 mass %) PE-D (5 mass %) | COC-A (65 mass %) COC-B (30 mass %) PE-D (5 mass %) | COC-A (65 mass %) COC-B (30 mass %) PE-D (5 mass %) |
| | glass transition temperature (° C.) | 96 | 96 | 96 | 96 | 96 |
| Layer B (outer layer) | components (mass %) | COP-C (100 mass %) | COP-C (100 mass %) | COP-C (100 mass %) | COP-C (100 mass %) | COP-C (100 mass %) |
| | glass transition temperature (° C.) | 100 | 100 | 100 | 100 | 100 |
| Film composition | cyclic olefin based resin (mass %) | 97.5 | 97.5 | 97.5 | 97.5 | 97.5 |
| | others (mass %) | 2.5 | 2.5 | 2.5 | 2.5 | 2.5 |
| Film orientation | plane orientation coefficient fn | 0.00 | 0.00 | 0.00 | 0.00 | 0.00 |
| Film production roller | surface roughness of mirror finished casting roller | 0.2S | 0.2S | 0.2S | 0.2S | 0.2S |
| | surface roughness of rubber nip roller Ra (μm) | 0.4 | 0.5 | 0.7 | 0.4 | 0.4 |
| Central region | surface roughness of surface A SRa (nm) | 5 | 13 | 11 | 6 | 8 |
| | surface roughness of surface B SRa (nm) | 378 | 494 | 687 | 363 | 177 |
| | thickness of central region t (μm) | 100 | 100 | 100 | 75 | 50 |
| Rough regions | thickness of rough region (μm) | 125 | 125 | 125 | 90 | 60 |
| | height of rough region h (μm) | 25 | 25 | 25 | 15 | 10 |
| | h/t | 25/100 | 25/100 | 25/100 | 20/100 | 20/100 |
| | width of rough region (mm) | 11 | 11 | 11 | 8 | 8 |
| Evaluation | Windability | A | A | A | A | B |
| | smoothness of mold transfer surface | A | B | B | A | B |
| | Moldability | A | A | A | S | A |
| | surface appearance of molded product | S | A | B | A | B |
| | overall evaluation | AA | BB | BB | AA | BB |

TABLE 2

|  |  | Example 6 | Example 7 | Example 8 | Example 9 | Example 10 |
|---|---|---|---|---|---|---|
| Structure | layer constitution | layer B/layer A/layer B | layer B/layer A/layer B | layer B/layer A/layer B | layer B/layer A/layer B | layer A |
|  | layer thickness (μm) | 17/66/17 | 17/66/17 | 17/66/17 | 17/66/17 | 100 |
|  | stacking ratio (total thickness of layer B/thickness of central region t) | 0.34 | 0.34 | 0.34 | 0.34 | monolayer |
| Layer A (inner layer) | components (mass %) | COC-A (65 mass %) COC-B (30 mass %) PE-D (5 mass %) | COC-A (65 mass %) COC-B (30 mass %) PE-D (5 mass %) | COC-A (65 mass %) COC-B (30 mass %) PE-D (5 mass %) | COC-A (95 mass %) PE-D (5 mass %) | COC-A (95 mass %) PE-D (5 mass %) |
|  | glass transition temperature (° C.) | 96 | 96 | 96 | 78 | 78 |
| Layer B (outer layer) | components (mass %) | COP-C (100 mass %) | COP-C (100 mass %) | COP-C (100 mass %) | COP-C (100 mass %) | — |
|  | glass transition temperature (° C.) | 100 | 100 | 100 | 100 | — |
| film composition | cyclic olefin based resin (mass %) | 97.5 | 97.5 | 97.5 | 97.5 | 95 |
|  | others (mass %) | 2.5 | 2.5 | 2.5 | 2.5 | 5 |
| Film orientation | plane orientation coefficient fn | 0.00 | 0.00 | 0.00 | 0.00 | 0.00 |
| Film production roller | surface roughness of mirror finished casting roller | 0.2S | 0.2S | 0.2S | 0.2S | 0.2S |
|  | surface roughness of rubber nip roller Ra (μm) | 0.4 | 0.4 | 0.4 | 0.4 | 0.4 |
| Central region | surface roughness of surface A SRa (nm) | 5 | 5 | 5 | 5 | 14 |
|  | surface roughness of surface B SRa (nm) | 378 | 378 | 378 | 381 | 384 |
|  | thickness of central region t (μm) | 100 | 100 | 100 | 100 | 100 |
| Rough regions | thickness of rough region (μm) | 110 | 125 | 125 | 125 | 125 |
|  | height of rough region h (μm) | 10 | 25 | 25 | 25 | 25 |
|  | h/t | 10/100 | 25/100 | 25/100 | 25/100 | 25/100 |
|  | width of rough region (mm) | 11 | 8 | 18 | 11 | 11 |
| Evaluation | Windability | B | B | B | A | A |
|  | smoothness of mold transfer surface | B | B | A | A | B |
|  | Moldability | A | A | A | A | S |
|  | surface appearance of molded product | B | B | A | A | B |
|  | overall evaluation | BB | BB | BB | AA | BB |

TABLE 3

|  |  | Comparative Example 1 | Comparative Example 2 | Comparative Example 3 | Comparative Example 4 | Comparative Example 5 |
|---|---|---|---|---|---|---|
| Structure | layer constitution | layer B/layer A/layer B | layer B/layer A/layer B | layer B/layer A/layer B | layer B/layer A/layer B | layer B/layer A/layer B |
|  | layer thickness (μm) | 17/66/17 | 17/66/17 | 17/66/17 | 17/66/17 | 17/66/17 |
|  | stacking ratio (total thickness of layer B/thickness of central region t) | 0.34 | 0.34 | 0.34 | 0.34 | 0.34 |
| Layer A (inner layer) | components (mass %) | COC-A (65 mass %) COC-B (30 mass %) PE-D (5 mass %) | COC-A (65 mass %) COC-B (30 mass %) PE-D (5 mass %) | COC-A (65 mass %) COC-B (30 mass %) PE-D (5 mass %) | COC-A (65 mass %) COC-B (30 mass %) PE-D (5 mass %) | COC-A (65 mass %) COC-B (30 mass %) PE-D (5 mass %) |
|  | glass transition temperature (° C.) | 96 | 96 | 96 | 96 | 96 |
| Layer B (outer layer) | components (mass %) | COP-C (100 mass %) | COP-C (100 mass %) | COP-C (100 mass %) | COP-C (100 mass %) | COP-C (100 mass %) |
|  | glass transition temperature (° C.) | 100 | 100 | 100 | 100 | 100 |
| Film composition | cyclic olefin based resin (mass %) | 97.5 | 97.5 | 97.5 | 97.5 | 97.5 |
|  | others (mass %) | 2.5 | 2.5 | 2.5 | 2.5 | 2.5 |
| Film orientation | plane orientation coefficient fn | 0.00 | 0.00 | 0.00 | 0.00 | 0.00 |
| Film production roller | surface roughness of mirror finished casting roller | 0.2S | 0.2S | 0.2S | 0.2S | 0.2S |
|  | surface roughness of rubber nip roller Ra (μm) | 0.2 | 1.5 | 0.4 | 0.4 | 0.4 |
| Central region | surface roughness of surface A SRa (nm) | 7 | 13 | 5 | 5 | 5 |
|  | surface roughness of surface B SRa (nm) | 12 | 1480 | 378 | 378 | 378 |
|  | thickness of central region t (μm) | 100 | 100 | 100 | 100 | 100 |
| Rough regions | thickness of rough region (μm) | 125 | 125 | 140 | 125 | no rough regions |
|  | height of rough region h (μm) | 25 | 25 | 40 | 25 | — |
|  | h/t | 25/100 | 25/100 | 40/100 | 25/100 | — |
|  | width of rough region (mm) | 11 | 11 | 11 | 30 | — |

TABLE 3-continued

|  |  | Comparative Example 1 | Comparative Example 2 | Comparative Example 3 | Comparative Example 4 | Comparative Example 5 |
|---|---|---|---|---|---|---|
| Evaluation | Windability | D | A | C | C | C |
|  | smoothness of mold transfer surface | A | D | B | B | D |
|  | Moldability | A | A | A | A | A |
|  | surface appearance of molded product | A | D | B | B | D |
|  | overall evaluation | DD | DD | CC | CC | DD |

INDUSTRIAL APPLICABILITY

The film is high in both windability during film production and processing steps and transfer surface smoothness and also has excellent appearance quality and moldability when produced by various molding methods such as vacuum molding, air-pressure molding, and press molding. Accordingly, the film can be used favorably for decoration of various molded components such as building materials, automobile components, portable telephones, home electric appliances, and personal computers.

The invention claimed is:

1. A non-oriented molding film having a machine direction, a transverse direction, a thickness direction, and comprising a cyclic olefin based resin wherein:
    a surface of the molding film comprises a central region and side edge parts located on each side of the central region in the transverse direction;
    the side edge parts comprise roughened regions extending in the machine direction along the molding film; and the film satisfies (1) to (3):
    (1) a surface of the molding film has a surface roughness SRa of 2 nm or more and 30 nm or less in the central region of the transverse direction and along the machine direction and defined as a region outside roughened regions, whereas an opposing surface of the molding film has a surface roughness SRa of 100 nm or more and 800 nm or less,
    (2) ratio h/t where h represents height (in pm) of the roughened regions while t represents thickness (in pm) of the central region is 5/100 or more and 30/100 or less, and
    (3) width of the roughened regions is 5 mm or more and 20 mm or less, wherein the thickness of the central region is 50 pm or more and 200 pm or less.

2. The molding film as described in claim 1 in the form of a multilayer film containing layer A and layer B, wherein layer A is composed primarily of a cyclic olefin copolymer resin (COC) and layer B is composed primarily of a cyclic olefin polymer resin (COP).

3. The molding film as described in claim 2, wherein the multilayer film comprises layer B, layer A, and layer B directly stacked in this order.

4. The molding film as described in claim 2, wherein layer A in the multilayer film has a glass transition temperature of 70° C. or more and 140° C. or less.

5. The molding film as described in claim 2, wherein layer B in the multilayer film has a glass transition temperature of 70° C. or more and 140° C. or less and that is equal to or higher than the glass transition temperature of layer A.

6. The molding film as described in claim 1 in the form of a monolayer film having a glass transition temperature of 70° C. or more and 140° C. or less.

7. A film roll comprising a core and the molding film as described in claim 1 wound up thereon.

8. A transfer foil comprising a clear layer, a decorating layer, and an adhesive layer stacked in this order on at least one side of molding film as described in claim 1.

9. The molding film as described in claim 3, wherein layer A in the multilayer film has a glass transition temperature of 70° C. or more and 140° C. or less.

10. The molding film as described in claim 3, wherein layer B in the multilayer film has a glass transition temperature of 70° C. or more and 140° C. or less and that is equal to or higher than the glass transition temperature of layer A.

11. The molding film as described in claim 4, wherein layer B in the multilayer film has a glass transition temperature of 70° C. or more and 140° C. or less and that is equal to or higher than the glass transition temperature of layer A.

12. The molding film as described in claim 1 in the form of a monolayer film having a glass transition temperature of 70° C. or more and 140° C. or less.

13. A film roll comprising a core and the molding film as described in claim 2 wound up thereon.

14. A film roll comprising a core and the molding film as described in claim 3 wound up thereon.

15. A film roll comprising a core and the molding film as described in claim 4 wound up thereon.

16. A film roll comprising a core and the molding film as described in claim 5 wound up thereon.

* * * * *

UNITED STATES PATENT AND TRADEMARK OFFICE
CERTIFICATE OF CORRECTION

PATENT NO. : 10,106,659 B2
APPLICATION NO. : 14/652526
DATED : October 23, 2018
INVENTOR(S) : Maeda et al.

Page 1 of 1

It is certified that error appears in the above-identified patent and that said Letters Patent is hereby corrected as shown below:

<u>In Claim 1</u>
In Column 23, at Lines 40 and 41, please change "(in pm)" to -- (in μm) -- at both occurrences; at Line 46, please change "50 pm" to -- 50 μm --; and "200 pm" to -- 200 μm --.

Signed and Sealed this
Second Day of April, 2019

Andrei Iancu
*Director of the United States Patent and Trademark Office*